United States Patent Office 2,699,001
Patented Jan. 11, 1955

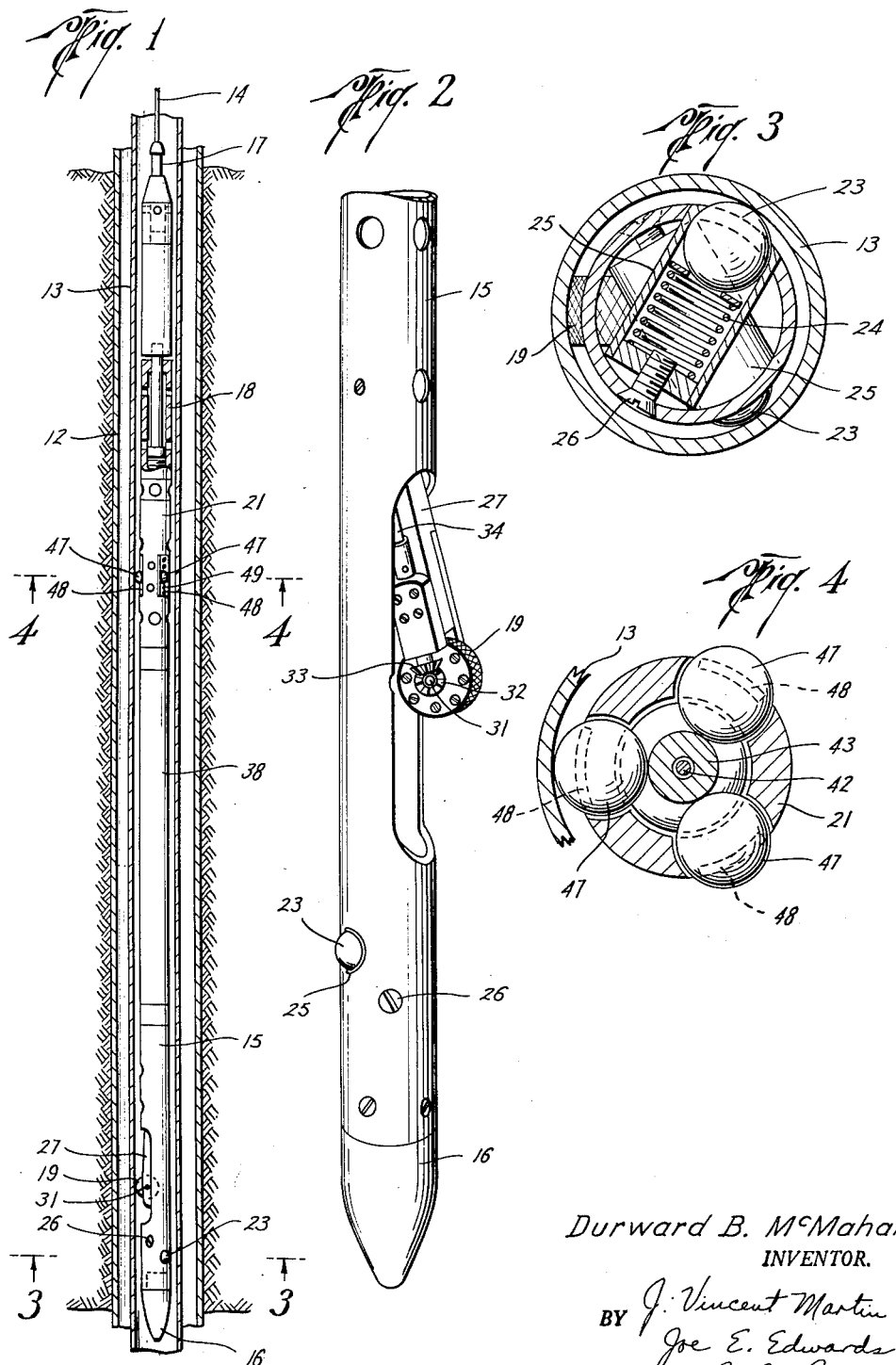

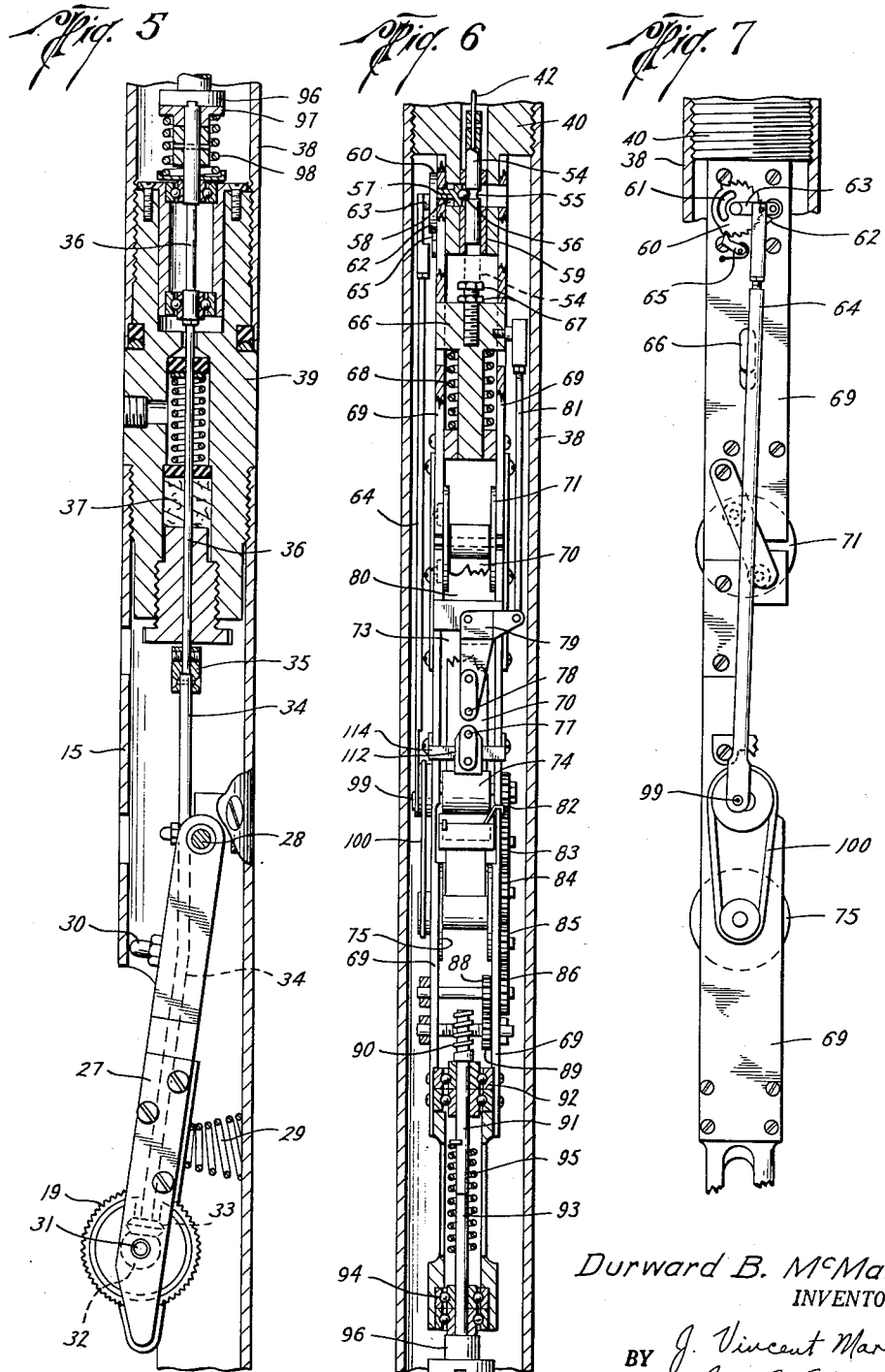

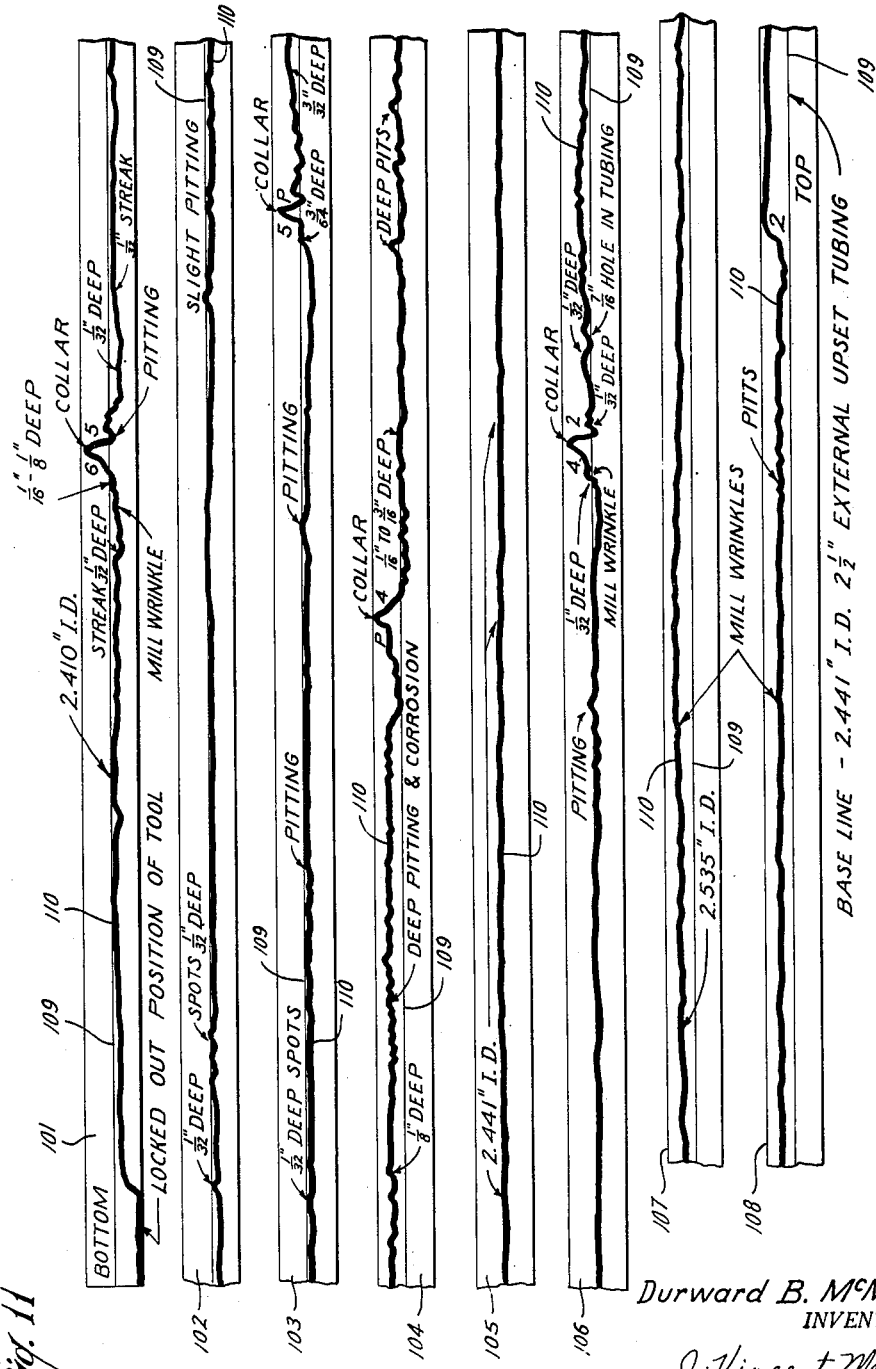

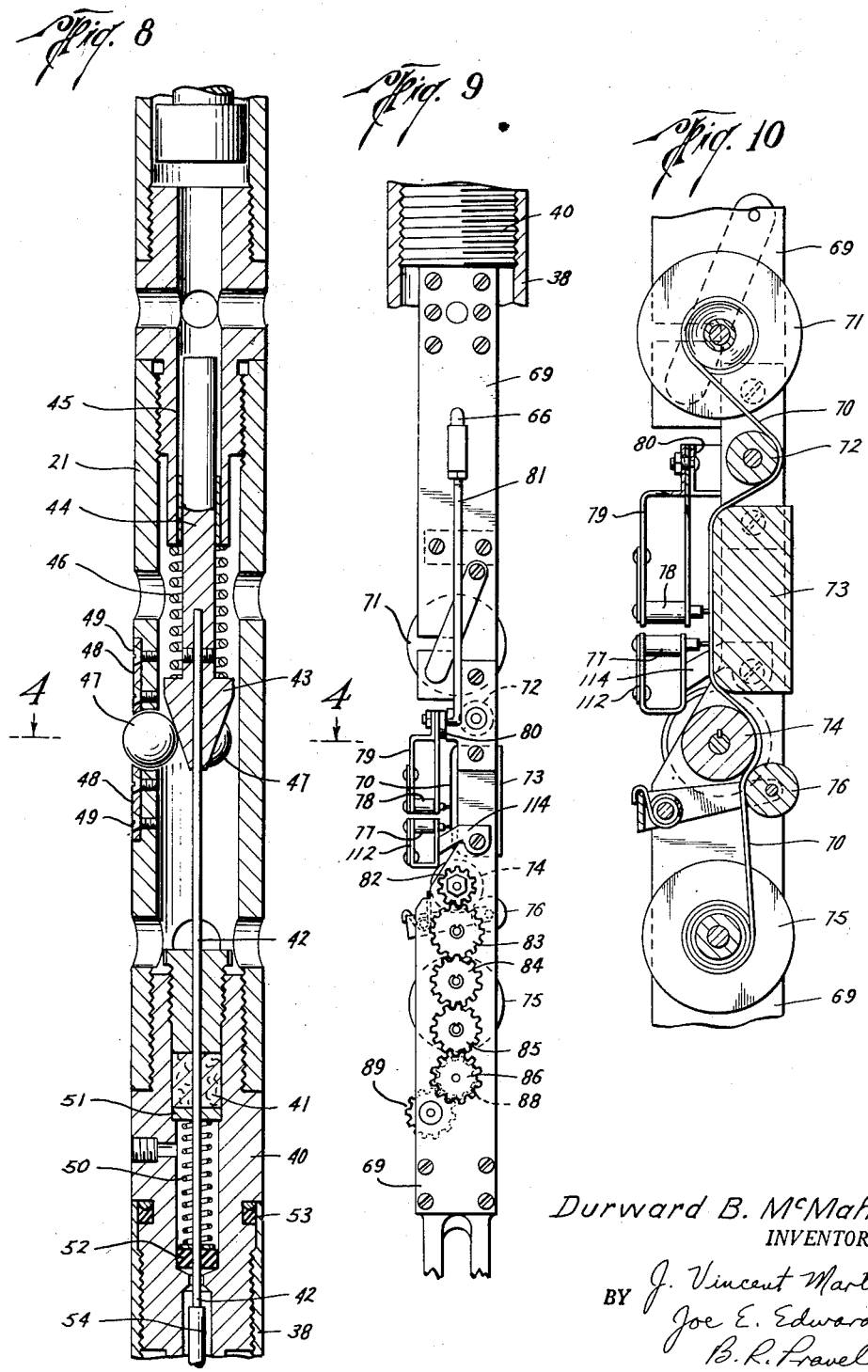

2,699,001

TUBING CALIPER

Durward B. McMahan, Duncan, Okla., assignor to M. M. Kinley and Jack Kinley, Houston, Tex.

Original application July 5, 1945, Serial No. 603,285. Divided and this application December 4, 1950, Serial No. 199,064

11 Claims. (Cl. 33—178)

This invention relates to recording calipers, and more particularly to mechanical means for measuring and recording the variations in internal diameter of pipe such as tubing or casing used in oil wells.

This application is a division of my prior co-pending application Serial Number 603,285, filed on July 5, 1945, which matured into Patent Number 2,544,609, issued March 6, 1951.

Pipe such as tubing used in oil wells sometimes becomes corroded or eroded by the passage of gas or liquid therethrough. In deep gas wells, for example, the tubing through which the gas flows may become weak in spots due to corrosion or erosion. This weakening usually occurs close to the collars which join the sections of pipe together, but is apt to occur anywhere and does not follow any set rule or definite pattern. Heretofore it has been the common practice to pull the tubing in such wells periodically and make an inspection visually or otherwise at the surface of the ground, but it has occasionally happened that the tubing has become so weakened that it parts when an attempt is made to pull it.

In accordance with the present invention it is proposed to provide a recording caliper which will measure and make a record of the condition of tubing or other pipe such as that used in wells so that information can be obtained which will indicate the rate of corrosion or erosion at any given point and will enable the operator of the well to know when the tubing should be pulled before there is danger of parting.

In accordance with the present invention the device is run through the pipe or tubing. If used in a well it is lowered on a measuring line or other flexible connector and is caused to make a record of variations in internal diameter of the pipe as it is being pulled out of the well. Various features of the invention are of utility in recording variations in internal diameter of pipe at the surface of the ground such as pipe lines and if the device is so used, no measuring line would be necessary if the device is pumped through the line. It seems obvious that where fluids are pumped under pressure in pipe lines or where pressure is present in a well, suitable packing is used to prevent leakage or loss of fluid. Generally a device called a casing head is employed at the top of a well, which is adapted to permit flowing of the well when desired but which retains the well under control. Such a device for this purpose is shown in the patent to G. H. Ennis issued on April 20, 1943, and bearing Number 2,317,039. The instant invention is of course operated on a flexible conductor through such casing head when the device is used on well pipe in situ and where such well has a pressure therein.

While the apparatus of the present invention is capable of recording some information as to longitudinal slots or other defects in pipe, it is particularly designed to record information as to the change in contour of the cross-sectional area inside pipe, and is particularly designed to record variations in the internal diameter of pipe caused by gas flow therethrough. If pump rods cause wear inside the tubing in an oil well, slots are formed in the tubing by the rods. However, where gas is flowing through tubing the pipe does not usually become weakened due to the formation of slots, but turbulent flow or other factors cause the tubing to become weakened at one or more places, the corrosion or erosion occurring more or less radially at a given place and enlarging the diameter of the pipe more or less uniformly. It is the enlargement of the internal diameter of pipe such as that caused by gas flow which the apparatus of the present invention is particularly designed to measure and record.

Accordingly, it is an object of the present invention to design a self-contained recording caliper adapted to be run through pipe and make a record of variations in the internal diameter thereof.

It is a further object of the invention to devise novel means for driving a recording chart or tape mounted in a body adapted to be moved through pipe such as that used in oil wells, the chart being driven in proportion to the movement of the body through the pipe.

Other objects and advantages reside in certain novel features of the arrangement and construction of parts, as will be apparent from the following description taken in connection with the accompanying drawings, in which:

Figure 1 is a vertical cross-sectional view of a part of a gas well showing apparatus constructed in accordance with the present invention located in the tubing therein;

Figure 2 is a perspective view of the lower portion of the recording caliper shown in Figure 1;

Figure 3 is a transverse cross-sectional view of the recording caliper shown in Figure 1, the view being taken on the line 3—3 thereof;

Figure 4 is a cross-sectional view taken through the metering head of the apparatus of Figure 1, the view being taken on the line 4—4 thereof;

Figure 5 is a vertical cross-sectional view of the lower portion of the apparatus of Figure 1;

Figure 6 is a vertical cross-sectional view of the intermediate portion of the apparatus shown in Figure 1 and illustrating the gear train and other mechanism for driving the recording chart or tape and of the mechanism for actuating the stylus which makes a record on the tape and also showing locking means for holding the stylus in fixed position while the apparatus is being lowered into a well;

Figure 7 is a fragmentary side view of the apparatus shown in Figure 6 and showing particularly the locking mechanism for holding the stylus and for holding the metering head in inoperative position while the apparatus is being lowered into the well;

Figure 8 is a vertical cross-sectional view of the upper portion of the apparatus shown in Figure 1 and particularly illustrating the construction of the metering head;

Figure 9 is a fragmentary side view of the recording apparatus shown in Figures 6 and 7 together with the gear train for driving the same;

Figure 10 is an enlarged cross-sectional view of the recording apparatus shown in Figure 9; and Figure 11 is a plan view of an actual record obtained with the apparatus shown in Figures 1 to 10, inclusive, together with an interpretation of the record.

Referring to the drawings in detail, and first to the complete assembly shown in Figure 1, it will be seen that the casing of a gas well is there illustrated at 12, the well being provided with a tubing 13 through which gas is being produced.

In accordance with the present invention a flexible conductor or line 14 is used to lower an elongated cylindrical body 15 into the well. At its lower end the body 15 may be provided with a tapered nose 16 and at its upper end it may be provided with a suitable fishing neck 17 and with a jar 18.

The elongated cylindrical body 15 contains recording apparatus driven by a drive wheel 19 and it is provided with a metering head 21 which when the apparatus is in operation to caliper the tubing, controls movement of a stylus in the recorder.

At the lower end of the body 15 near the nose 16 a yieldable centering arrangement is provided. This is shown in cross-section in Figure 3 and may consist of the drive wheel 19 adapted to ride along one side of the tubing and two spring pressed balls 23 spaced 120 degrees from the drive wheel 19. The balls 23 and the springs 24 cooperating with them may be mounted in suitable cylindrical housings 25 held in place by screws 26 as shown in Figure 3. While any other suitable centering means such as drag springs might be used it is advantageous to utilize one of the centering elements, i. e. the wheel 19, for the additional function of actuating the chart-operating mechanism as above explained. The two spring pressed balls are arranged in opposed relation with respect to the wheel and therefore press the wheel into driving contact with the inner wall of the pipe.

As shown in Figures 1 and 2, the wheel 19 which drives the recording chart or tape is mounted in the body 15 immediately above the centering balls 23. As shown in Figures 2 and 5 the drive wheel 19 is mounted upon an arm 27 pivoted on a shaft 28 located within the tubular body 15. A coil spring 29 (Figure 5) urges the arm 27 to the left as viewed in Figure 5 and causes the wheel 19 to engage the tubing 13. An adjustable stop 30 limits movement of the arm 27 to convenient effective range.

The drive wheel 19 is provided with a knurled or roughened surface so that as the body 15 is moved through the tubing 12 the wheel 19 will be rotated. The shaft 31 upon which the wheel 19 is mounted is provided with a bevel gear 32 in mesh with a companion bevel gear 33 secured to a flexible shaft 34 which is in turn connected by coupling 35 to a rotating shaft 36 extending through a gland 37 into the interior of the recorder housing.

The recorder housing consists of a tubular casing 38 connected to the body 15 by a coupling member 39 (Figure 5) at its lower end which contains the gland 37. The casing 38 has a similar coupling member 40 (Figure 8) at its upper end, which contains a gland 41 through which a longitudinally movable rod 42 extends, which rod actuates the stylus of the recorder.

The metering head 21 contains mechanism which when the apparatus is in operation to record variations in diameter of the tubing 13 moves the rod 42 up and down in response to variation in diameter of the tubing. This metering head is shown in vertical cross-section in Figure 8 and in transverse cross-section in Figure 4. As shown in these figures the arrangement includes a member 43 having the general shape of a truncated cone secured to the rod 42 and mounted for movement longitudinally of the metering head 21. The member 43 is provided with a guiding spindle 44 extending up into a bearing 45 screw threaded into the top of the metering head 21. A coil spring 46 abuts against the top of the member 43 and against the bottom of the bearing 45 so as to urge the member 43 downwardly at all times.

By means which will be described hereinafter, downward movement of the member 43 may be prevented while the apparatus is being lowered into the well but when the arrangement is in calipering or operating position downward movement of the member 43 is limited only by radial movement of three balls 47 mounted in the metering head so as to engage the conical surface of the member 43, the balls thus serving as feelers which move the member 43 in accordance with variations in internal diameter of the pipe 13. The balls 47 are shown spaced circumferentially of the metering head 21, 120 degrees apart, but it is not necessary that this exact spacing be employed.

The balls 47 are held in place on the metering head by means of plates 48 held by screws 49. It will be obvious that there is sufficient play in this mounting to permit the balls to move in and out radially depending upon variations in diameter of the tubing 13 with which they are in contact as shown in Figure 4 when the calipering operations are being performed.

The taper of the conical surface of member 43 is such that the balls 47 tend to lift it against the action of the spring 46 when the assembly passes from a section of the tubing having a large diameter into a section having a small diameter. An angle of 42 degrees with respect to the center line of the rod 42 has been found to be a satisfactory taper for the conical surface of member 43.

It will be apparent that since three balls 47 are provided each will be in contact with the wall of the tubing or pipe being measured and that this arrangement serves to permit movement of the tool to accommodate eccentric or non-circular sections of the tubing, the metering head being located some distance vertically above the centering arrangement provided by the balls 23 near the bottom of the tool.

As mentioned above, the rod 42 extends through a gland 41 into the recorder housing 38. The gland 41 may have its packing under spring tension provided by the coil spring 50 and the disk 51 and a rubber stopper 52 may also be provided to insure against the leakage of any fluid into the recorder housing. Chevron packing 53 may be provided as illustrated adjacent the threads on the cylindrical housing 38 and on the coupling member 40.

As shown at the bottom of Figure 8 and at the top of Figure 6 the rod 42 just below the point where it enters the recorder housing 38 is connected to a lock plunger 54. This plunger is provided with a detent 55 in which a small locking ball 56 is positioned when movement of the plunger 54 is to be prevented, as during lowering of the device into a well. The locking ball 56 is held against radial movement by a release pin 57 mounted for radial movement in a slot 58 in the depending guiding sleeve 59 of the coupling member 40. When in locked position outward movement of the release pin 57 is prevented by a ratchet disk 60 which is provided with a concentric slot 61 as shown in Figure 7. When the disk 60 is rotated to the proper position the release pin 57 may enter the slot 61, whereupon the ball 56 is freed to move radially and permit longitudinal movement of the plunger 54. The disk 60 may be rotated clockwise as viewed in Figure 7 by means of the ratchet pawl 62 mounted on the lever 63 actuated by the connecting rod 64. A second pawl 65 prevents counter-clockwise movement of the disk 60.

It will be observed that the disk 60 has ratchet teeth only over a portion of its periphery, there being a section adjacent the slot 61 which has no teeth. When the disk is turned into the position about 180 degrees from that illustrated with the blank section under the pawl 62, further reciprocatory movement of the connecting rod 64 will not rotate the disk 60. Thus, when the disk 60 is rotated in the initial upward movement of the caliper to permit movement of the release pin 57 the disk stays in the released position until manually reset. As long as the plunger 54 is held in the locked position as shown in Figure 6 the member 43 shown in Figure 8 cannot move with respect to the body of the tool. In this position the member 43 may be out of contact with the balls 47 and the device may be lowered into the well freely without the balls 47 contacting the walls of the tubing. However, when the locking means provided by the ball 56 and release pin 57 permits the plunger 54 to move downwardly the member 43 engages the balls 47 and further downward longitudinal movement under the action of the spring 46 is limited in varying amounts, depending upon the internal diameter of the pipe or tubing in which the device is located, due to the action of the balls 47.

To make a record of the movement of the plunger 54 after it is released, and thus make a record of movement of the member 43 which is proportional or responsive to variations in the internal diameter of the tubing being calipered, a floating anvil 66 is provided immediately beneath the plunger 54. This anvil may be provided with an adjustable abutment 67 for engagement with the bottom of the plunger 54 and it is urged upwardly by a coil spring 68 and is mounted for longtiudinal movement in the frame plates 69.

The frame plates 69 as shown in Figures 6, 7 and 9 may be secured at their upper ends to the coupling member 40 and at their lower ends to the one way clutch mechanism to serve as a framework for mounting reels and driving mechanism for a tape or recording chart and also serve as means for mounting the recording stylus. As best shown in Figure 10, the recording tape 70 travels from a supply spool 71 under a guide roller 72 across the recording base 73, under a driving roller 74 and onto the receiving spool 75. A spring pressed idler pulley 76 is provided to keep the tape in contact with the driving roller 74. Two styluses are provided for making marks upon the tape 70. One of these, shown at 77 is supported on a bracket 112 which is attached to a cross member 114 secured to the plates 69 and thereby the stylus 77 is held in fixed position and merely traces a line upon the tape which serves as a base line for indicating what the internal diameter of the tubing or pipe being calipered should be. The other stylus shown at 78 is mounted on a bell crank lever 79 pivoted on a cross member 80 secured to the plates 69. By means of a connecting rod 81 the bell crank lever 79 is connected to the anvil 66 so that the stylus 78 is moved back and forth across the tape 70 in response to movement of the anvil 66 and in accordance with variations of movement of the member 43 depending upon variations in the internal diameter of the tubing being calipered, as explained above.

The driving roller 74 for the tape 70 is driven through a gear train connected to the rotating shaft 36 entering the recorder housing at its lower end through the coupling member 39, as explained above. The train of gears is shown as consisting of gear wheels 82, 83, 84, 85, 86, 88 and 89, the gear wheel 82 being fixed to the shaft which mounts the driving roller 74, while the gear 89 is mounted on a shaft which is driven by a worm gear 90 connected to a longitudinally disposed shaft 91 mounted in a ball bearing 92 at the lower end of the frame plates 69. The shaft 91 is connected by a one-way clutch to a shaft 93 coaxially mounted with it in a ball bearing 94. The one-way clutch is provided by means of the tightly fitting coil spring 95 mounted on the two shafts 91 and 93 with one end being secured to the shaft 91. The coil spring 95 transmits rotation from the shaft 93 to the shaft 91 only when the shaft 93 is rotated in the direction tending to wind up the coil, that is to say, while the caliper is being drawn upwardly in the tube. Beneath the bearing 94 the shaft 93 is provided with a clutch jaw 96 adapted to make connection with a similar clutch jaw 97 (see top of Figure 5) which is secured to and driven by the shaft 36. The clutch jaws 96 and 97 are held in engagement by a coil spring 98. The clutch provided by the jaws 96 and 97 serves as means for quick assembly and disassembly when a recording apparatus is placed in or removed from the device. As shown in Figure 5, the shaft 36 is provided with suitable ball bearings near its upper end and it is provided with means for maintaining a tight seal around it similar to that described above in connection with the sealing means for the shaft 42.

The locking means shown at the top of Figures 6 and 7 for controlling movement of the plunger 54 as described above, is operated to release the plunger 54 automatically upon a predetermined amount of upward movement of the device through tubing being calipered. This automatic operation is brought about by connecting the rod 64 which drives the disk 60 through an eccentric 99 mounted on the same shaft as the driving roller 74 for the tape. Since the driving roller 74 is driven only in one direction by the driving wheel 19 and the means for transmitting motion from the wheel 19 to the roller 74, there is no rotation of the disk 60 until the calipering device is moved upwardly through the tubing, it being understood that the roller 74 does not rotate when the device is being lowered into the well because of the one-way clutch arrangement provided by the spring 95. When the roller 74 begins to move the tape 70, however, rotation of the eccentric 99 begins to actuate the ratchet pawl 62 and rotates the disk 60 to release the plunger 54. Thus, after a predetermined amount of upward movement of the device through the tubing the locking means releases the plunger 54. Likewise, after a predetermined amount of upward movement of the device through the tubing the stylus 78 begins to move back and forth, for until the plunger 54 is released the coil spring 68 holds the anvil 66 in fixed position at the upper end of the slots provided in the frame plates 69.

To keep the tape being wound upon the receiving spool 75 reasonably taut and yet permit some slippage between it and the driving roller 74 a spring belt 100 connects its shaft to the shaft upon which the driving roller 74 is mounted.

In Figure 11, contiguous sections of a recording paper tape made with the apparatus shown in Figures 1 to 10, are illustrated at 101, 102, 103, 104, 105, 106, 107 and 108. On these sections of the tape, the straight line approximately down the center as shown at 109 is that made by the stylus 77, while the wavy line shown at 110 is that made by the stylus 78, and records variations in diameter of tubing which was being calipered. It will be observed that in some places the tubing was of smaller diameter than it was supposed to be, whereas in other places due to corrosion or erosion or to other causes it was of an internal diameter considerably greater than it was supposed to be. Other variations such as collars, pitting and mill wrinkles are plainly indicated on the graph and are so marked on Figure 11.

While only one embodiment of the invention has been shown and described herein it is obvious that various changes may be made without departing from the spirit of the invention. For example, while the recording means has been shown as consisting of a paper tape, it is obvious that photographic film could be used, and it is further obvious that instead of the use of a stylus other tracing means such as a light beam might be used for making the record. Also other means than the gear train specifically illustrated and described might be used to transmit motion from the wheel 19 to the roller which drives the recorder.

Other changes will be apparent to those skilled in the art without departing from the spirit of the invention or the scope of the annexed claims.

I claim:

1. In a recording caliper adapted for use in measuring the inside diameter of pipe in a well, the combination comprising an elongated cylindrical body adapted to be run inside the pipe, a recording chart in said body, a spring pressed wheel carried by the body for engaging the interior of the pipe to be rotated thereby in opposite directions according to the direction of movement of the caliper in the pipe and mechanism including one-way clutch for driving the chart only when said body is moved upwardly through the pipe, a stylus mounted in said body for movement with respect to said body and with respect to said chart for making a graph on said chart, a metering head carried by said body and having a member mounted for movement longitudinally of said body, a spring for urging movement of said member in one direction and contact means so mounted as to limit movement of said member in the direction urged by said spring in varying amounts depending upon variations in the internal diameter of the pipe and means for causing said stylus to move in proportion to movement of said member.

2. In a recording caliper for measuring the inside diameter of pipe in a well, the combination comprising an elongated body adapted to be run inside the pipe, a recording chart in said body, means carried by said body near one end thereof having a wheel for engaging the interior of the pipe to be rotated thereby in opposite directions according to the direction of movement of the caliper in the pipe and having a flexible shaft connected to said wheel for driving said chart upon movement of said body in said pipe, said shaft also including a one-way clutch, whereby said chart is driven when said body is moved in one direction only in said pipe, tracing means movable with respect to said chart for making a graph thereon, a metering head carried by said body near the end thereof opposite from said chart driving means, said metering head including a plurality of feelers for engaging the inside of the pipe and a spring loaded movable member contacting said feelers and being connected to said tracing means to move said tracing means in response to movement of said feelers.

3. In a recording caliper for measuring the inside diameter of pipe in a well, the combination comprising an elongated body adapted to be run on a flexible connector in the pipe, a recording chart mounted for movement inside said body, means carried by said body beneath said chart, said means including a spring pressed wheel for engaging the interior of the pipe to be rotated thereby in opposite direcions according to the direction of movement of the caliper in the pipe, a drive means connected to said wheel for driving said chart upon movement of said body in said pipe, said drive means also including a one-way clutch connection to drive said chart only when said body is moved in one direction in the well, tracing means movable with respect to said chart for making a graph thereon, a metering head carried by said body above said chart, said metering head having a plurality of feelers for engaging the inside of the pipe and a spring loaded movable member contacting said feelers and being connected to said tracing means to move said tracing means in response to movement of said feelers.

4. A recording caliper tool for the measuring of variations of the inside surface of a long string of pipe in a well bore comprising, a housing, a connection to lower and raise said housing in the pipe, a recording mechanism in said housing including a pair of tracing members each adapted to trace a separate line and a recording chart, which tracing members are engageable with said chart and are relatively movable with respect to said chart so as to trace a pair of lines on said chart to create a record of pipe surface variations, means projecting from said housing to engage the pipe surface to move one of said tracing members only when the tool moves upwardly in the pipe, the movement of said means being occasioned by variations in the pipe surface, a support holding the other of said tracing members in stationary position in the housing, additional means also projecting from said housing to engage the pipe surface and to be driven thereby as a function of the upward movement of the tool in the pipe, and a connection from said additional means to actuate said recording chart while said tracing members are in engagement therewith for record making whereby such record will identify pipe surface variations.

5. A recording caliper tool for the measuring of variations of the inside surface of a long string of pipe comprising a housing, a connection to move said housing in the pipe, a recording mechanism in said housing including a pair of stylus members, and a chart member with which said styluses are engageable to trace a pair of lines on said chart member so as to create a record of pipe surface variations, means projecting from said housing to engage the pipe surface, a connection from said means to move one of said stylus members, the movement of said means being occasioned by variations in the pipe surface, a support holding the other stylus fixed in the housing adjacent to the chart member, additional means also projecting from said housing to engage the pipe surface and to be driven thereby as a function of the movement of the tool in the pipe, and a connection from said additional means to cause relative movement between said chart member and said pair of stylus members while said chart member and stylus members are in engagement for record making whereby such record will identify pipe surface variations.

6. In a recording caliper tool for the measuring of variations of the inside surface of a long string of pipe, a housing, a record mechanism including a pair of stylus members, and a recording chart member, which styluses and chart are engageable and relatively movable to cause said stylus members to trace a pair of lines on said chart member so as to create a record of pipe surface variations, means projecting from said housing to engage the pipe surface to move one of said styluses, the movement of said means being occasioned by variations in the pipe surface, a support holding the other stylus fixed in the housing adjacent to the chart member, additional means projecting from said housing to engage the pipe surface and to be driven thereby as a function of the movement of the tool in the pipe, and a connection to cause relative movement between said chart member and the pair of stylus members while said stylus members are in engagement with said chart member for record making whereby such record will identify pipe surface variations.

7. In a recording device adapted for use in oil wells or the like, a housing, a chart located therein, a stylus for tracing a graph on said chart, a spur gear train for driving said chart in proportion to movement of said housing in one direction in the well while not actuating the same when said housing is moved in the opposite direction in the well and for locking said stylus in a fixed position while said housing is moved in such opposite direction in the well, said drive means including a spring pressed arm pivoted to said housing, a wheel mounted on said arm and adapted to engage the wall of the well and rotate whenever the housing is moved in one direction or the other in the well, a shaft connected to said wheel for rotation thereby and extending into said housing, a one-way clutch connecting said shaft to said drive means whereby the train will be actuated only when said housing is moved in one direction in the well.

8. In a recording caliper tool for recording variations of the inside diameter as well as variations of surface irregularities such as corroded surfaces, and depressions comprising a body housing, a recording mechanism including a chart member, a plurality of stylus members to contact and mark said chart member with a plurality of separate lines thereon, means supporting one stylus member in a fixed position in said housing to mark a line on said chart as to the normal pipe surface as indicative of the normal pipe diameter, additional means to move at least one of the other stylus members relative to said chart to record surface variations including a movable device projecting from said body, spring means urging said additional means against the surface being calipered whereby the record provides a base line record and a surface variation record taken simultaneously on the same chart member.

9. In a recording caliper tool for recording variations of the inside diameter as well as variations of surface irregularities such as corroded surfaces and depressions, comprising a body housing, a recording mechanism including a chart member, a plurality of tracing members to contact and mark said chart member with a plurality of separate lines thereon, means to cause a relative movement between said chart member and said tracing members including a movable device projecting from said body, additional means projecting from said body to move at least one of said tracing members in accordance with the surface variations in the inside diameter, support means for at least one of said tracing members preventing movement thereof during calipering other than said relative movement caused by said first mentioned means so that a base line record is obtained for enabling interpretation of the lines traced by the tracing means which records surface variations.

10. A recording caliper for use in indicating surface variations of pipe, comprising a cylindrical casing, a chart and chart-operating mechanism in the casing, a wheel mounted in the casing for driving engagement with the pipe and a connecting train between the wheel and the chart-operating mechanism, a stylus held in fixed position in the casing adjacent to the chart for tracing a base line thereon, a second stylus movably mounted adjacent to the fixed stylus, spring actuated feelers carried by the casing for engaging the pipe, and means for moving said second stylus in response to the calipering movement of the feelers.

11. A recording caliper for use in indicating surface variations of pipe, comprising a cylindrical casing having a feeler-controlled plunger therein, a movable anvil aligned with the plunger, spring means holding the anvil in a predetermined initial position while permitting it to be displaced by movement of the plunger, a movable chart, and a stylus movably mounted adjacent to the chart and controlled in its operation by connection with said anvil.

References Cited in the file of this patent

UNITED STATES PATENTS

| | | |
|---|---|---|
| 713,784 | Mellor | Nov. 18, 1902 |
| 1,339,955 | Hardel | May 11, 1920 |
| 1,890,607 | Hite | Dec. 13, 1932 |
| 1,901,567 | Rogatz | Mar. 14, 1933 |
| 1,905,200 | Williams | Apr. 25, 1933 |
| 1,907,168 | Williams | May 2, 1933 |
| 1,951,629 | Ross | Mar. 20, 1934 |
| 2,102,080 | Kinley | Dec. 14, 1937 |
| 2,292,938 | Hennessy | Aug. 11, 1942 |
| 2,322,343 | Brandon | June 22, 1943 |
| 2,348,643 | Poole | May 9, 1944 |
| 2,392,357 | Bays | Jan. 8, 1946 |
| 2,544,609 | McMahan | Mar. 6, 1951 |

FOREIGN PATENTS

| | | |
|---|---|---|
| 571,622 | Great Britain | Sept. 3, 1945 |